No. 870,342. PATENTED NOV. 5, 1907.
A. H. BOSTLEY.
VALVE.
APPLICATION FILED MAR. 20, 1906.
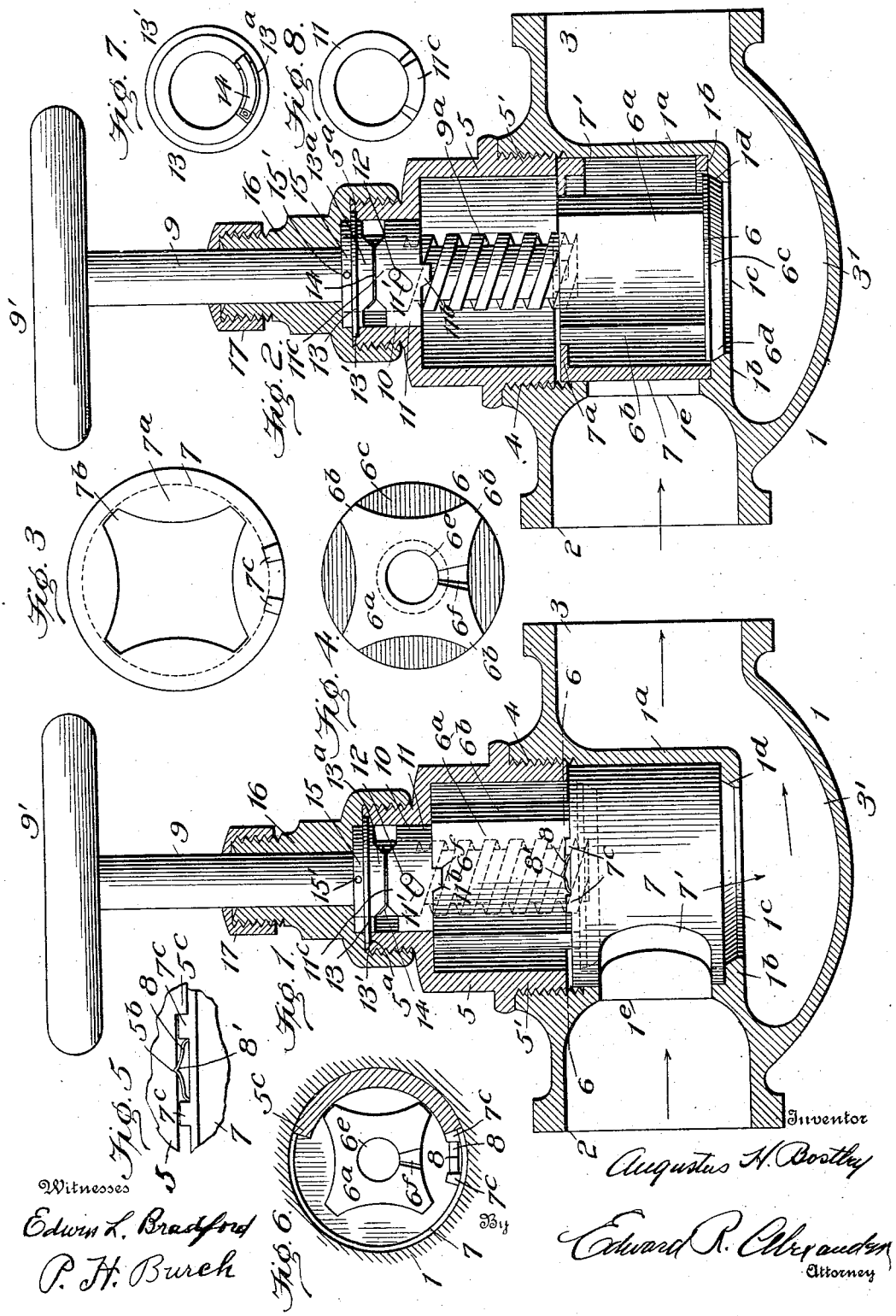

UNITED STATES PATENT OFFICE.

AUGUSTUS H. BOSTLEY, OF SOUTH WILLIAMSPORT, PENNSYLVANIA, ASSIGNOR OF ONE-THIRD TO GEORGE H. YOUNG, OF WILLIAMSPORT, PENNSYLVANIA, AND ONE-THIRD TO BENJAMIN F. AUCHMUTZ, OF SOUTH WILLIAMSPORT, PENNSYLVANIA.

VALVE.

No. 870,342.      Specification of Letters Patent.      Patented Nov. 5, 1907.

Application filed March 20, 1906. Serial No. 307,111.

*To all whom it may concern:*

Be it known that I, AUGUSTUS H. BOSTLEY, a citizen of the United States, residing at South Williamsport, in the county of Lycoming and State of Pennsylvania, have invented new and useful Improvements in Valves, of which the following is a specification.

This invention relates to improvements in valve mechanism for controlling the passage from one point in a conduit to another of fluid pressure medium, gas or liquids.

The object of the invention is to provide a simple and efficient compound valve arranged to form a double cut off within the valve casing.

Figure 1 is a view partly in side elevation and partly in central vertical longitudinal section of a valve mechanism embodying my improvements with the parts shown in the positions in which the passageway through the valve is open. Fig. 2 is a similar view showing the passageway through the valve closed. Fig. 3 is a top plan view of the rotary supplemental cut-off cylinder. Fig. 4 is a top plan view of the reciprocatory main valve. Fig. 5 is a fragmentary view showing the spring lock for the rotary valve. Fig. 6 is a section on the lines 6—6, Fig. 1. Figs. 7 and 8 are details.

In the drawings, 1 represents as an entirety a valve casing or shell. Preferably it is formed with a centrally arranged cylindrical portion $1^a$ having an inner wall $1^b$ with a passageway $1^c$ therethrough having a conical valve seat $1^d$ therein. At one side, this cylindrical portion has an opening $1^e$ communicating with a laterally extending passageway 2. 3 is a laterally extending passageway arranged diametrically opposite to the passageway 2 and having a portion $3'$ on the inner side of the cylindrical part $1^a$ and communicating with the passageway $1^c$. The passageway through the casing is indicated by arrows in Figs. 1 and 2. The outer end of the cylindrical part $1^a$ is internally screw threaded as indicated at 4 to receive the screw threaded end $5'$ of a cap or supplemental cylinder 5.

6 is a main reciprocating valve. It has a shank like portion $6^a$ having a series of longitudinal ribs $6^b$. At the bottom of this shank like portion is a valve plate or head $6^c$ having a conical surface $6^d$ corresponding with the conical seat $1^d$ in the bottom plate $1^b$ with which it is adapted to engage. The shank $6^a$ is hollow at its center and internally screw threaded as indicated at $6^e$. $6^f$ is a recess in the top wall of said shank the purpose of which will be hereinafter described.

7 is a rotary hollow cylindrical valve snugly fitted within the cylindrical part $1^a$ and resting upon the bottom $1^b$ thereof. $7'$ is an opening through the side walls of said rotary valve arranged to register with the opening $1^e$ and to thus establish communication with the passageway 2. At its upper end this rotary supplemental or auxiliary valve has a top plate or web $7^a$ which is cut away as indicated at $7^b$ to receive the ribs $6^b$ of the shank of the main reciprocating valve. $7^c$, $7^c$, are lugs projecting upwardly from the top of the said rotary valve.

8 is a flat spring fitted between the lugs $7^c$, $7^c$, and bent to have an upwardly extending point $8'$, the purpose of which will be hereinafter set forth.

The ribs $6^b$ of the main valve fit snugly into the corresponding grooves in the supplemental rotary valve in such manner as to insure the simultaneous and uniform rotation of both the said valves when either of them is rotating.

9 is a valve stem having at its outer end a suitable hand gripping part $9'$, its inner end being screw threaded at $9^a$ to engage the internal threads in the shank of the main valve.

10 is a clutch mechanism interposed between the stem 9 and the shank $6^a$ of the reciprocating main valve.

For the sake of illustration I have shown this clutch mechanism as comprising a collar 11 loosely mounted upon the valve stem 9 and connected thereto by a pin 12 adapted to operate in a slot $11'$ in the said collar, which slot is arranged at an angle to the axis of the valve stem so as to permit movement of said collar longitudinally of the stem. From the inner face of this collar projects a lug or projection $11^b$ the walls of which are arranged to engage with the walls of the recess $6^f$ in the top of the main valve. $11^c$ is a projection or lug on the outer face of the said collar.

13 is a collar loosely fitted upon the valve stem 9 and having a laterally extending flange $13'$ which engages with the walls of a recess $5^a$ in the top of the cap or supplemental cylinder 5.

$13^a$ is an inwardly extending lug or projection or extension carried by the collar 13 and arranged to engage with the lug $11^c$ on the clutch collar 11 in order to effect certain operation of the said clutch collar to be hereinafter set forth. 14 is a flat spring secured at one end to the inner surface of said lug $13^a$ and arranged to assist the said lug in its controlling of the clutch collar.

15 is a washer arranged outside of and closely adjacent to the collar 13 and secured to the stem 9 by means of a pin $15'$.

16 is a cap suitably fitted to the cap or supplemental cylinder 5 and 17 is a stuffing box of any well known construction carried by said cap 16 and adapted to form a pressure tight joint between it and the valve stem 9.

$5^b$, $5^b$, are radial grooves in the inner wall of the cylindrical housing of the part 5 arranged to receive the projection $8'$ of the spring 8 and to hold the rotary valve 7 in either open or closed position. The rotary travel of this valve is preferably limited to substantially 180° by the engagement of one of the lugs 7ᶜ, 7ᶜ with one end of a curvilinear projection 5ᶜ on the inner end of the supplemental cylinder 5.

The operation of the device is as follows: Assuming that the valve is open and that the parts are in the relative position shown in Fig. 1, the gas, motive fluid, or liquid in the passageway 2 enters through the lateral opening 7′ in the rotary valve, passes beneath the plate or head 6ᵉ of the main valve downward through the passageway 1ᵉ into the chamber 3′ and thence to the passageway 3. In order to close the valve the stem 9 is turned, as customary with such stems, in clockwise direction the first effect of which is to rotate both the main valve and the supplementary rotary cylindrical valve in such manner as to cut off communication between the passageway 2 and the opening 7′ through the rotary valve since the clutch collar 11 is held by the projection 13 so as to cause the engagement of the lug 11ᵇ with the walls of the recess 6ᶠ in the main valve. The turning of the supplemental valve will be stopped by the engagement of one of the lugs 7ᶜ thereon with one end of the curvilinear projection 5ᶜ on the supplemental cylinder 5. Substantially simultaneously with the cutting off of this communication the lug 11ᶜ on the outer face of the clutch collar 11 is rotated to the point at which it is out of alinement with the projection 13ᵃ on the collar 13 and with the further rotary movement of the said valve stem, the collar 11 is forced outwardly because of the formation and relationship of the walls of the lug 11ᵇ and of the recess 6ᶠ of the main valve shank, and the said main valve is no longer connected to the stem 9 so as to turn therewith, but instead the threaded portion of the said shank turns within the main valve and causes it to travel inwardly toward its seat 1ᵈ, until it has seated and completely and effectively established a second cut off.

To act upon the valve, the stem 9 is rotated as usual with valves of this type, in anti-clockwise direction and the main valve is caused by the screw threaded portion of the valve stem 9 to travel outwardly away from its seat until the walls of the recess 6ᶠ thereof are engaged by the walls of the projection or lug 11ᵇ on the clutch collar 11. This occurs as the outer end of the main valve approaches the clutch collar 11, for just at this time the outer projection 11ᶜ on the said collar comes into engagement with the inward projection 13ᵃ of the collar 13 and the clutch collar is moved inwardly forcing the said lug 11ᵇ thereon into the recess 6ᶠ. As soon as this connection is established between the clutch collar and the main valve, the said main valve will rotate with the stem 9 and in turn will cause the rotary motion of the rotary valve 7 in such manner as to effect the communication between the passageway 7ᵃ therethrough and the lateral passageway 2 in the valve casing. The rotary valve may be continued to be opened until the proper projection 7ᶜ on the rotary valve engages the stop 5ᶜ and indicates the open position of the rotary valve.

It will be noted that the rotary valve is always in its closed position cutting off the passageway through the valve casing whenever the main valve is drawn away from its valve seat and that consequently the main valve may be seated or unseated independently of the pressure of the fluid or gas, the flow of which through the valve casing is checked by the rotary valve. When the rotary valve is open the fluid or gas then permitted to pass through the valve casing acts uniformly on all portions of the main valve seat and main valve head. In the event that the valve is used in a steam supply system "wire drawing" at the seat of the main valve is prevented because the flow of steam to the main valve is cut off prior to the seating or unseating of said valve.

What I claim is:

1. In a valve mechanism, the combination with a suitable casing having a passageway therethrough and a valve seat in said passageway, of means for opening and closing the passageway through said casing comprising a main valve arranged to reciprocate to and from said valve seat, a hollow rotary valve surrounding said reciprocatory valve, and means for actuating said valves, said means being inactive to rotate said rotary valve until said main valve is in a predetermined position relative to said rotary valve.

2. In a valve mechanism, the combination with a suitable casing having a passageway therethrough and a valve seat in said passageway, of means for opening and closing the passageway through said casing comprising a main valve arranged to reciprocate to and from said valve seat, a hollow rotary valve surrounding said reciprocatory valve, and means for actuating said valves, said means being disconnected from said rotary valve when acting to move said main valve to or from a predetermined position relative to said rotary valve.

3. In a valve mechanism, the combination with a suitable casing having a passageway therethrough and a valve seat in said passageway, of means for opening and closing the passageway through said casing comprising a main valve arranged to reciprocate to and from said valve seat, a hollow rotary valve surrounding said reciprocatory valve, and means for actuating said valves, said means arranged to reciprocate said main valve within said rotary valve and to automatically effect the rotation of said rotary valve in either direction when the main valve is a predetermined distance from said valve seat.

4. In a valve mechanism, the combination with a suitable casing having a passageway therethrough and a valve seat in said passageway, of means for opening and closing the passageway through said casing comprising a main valve arranged to reciprocate to and from said valve seat, a hollow rotary valve surrounding said reciprocatory valve, and mechanical means for automatically effecting the rotation of the rotary valve and then the closing of the main valve, and for opening the main valve and then rotating the rotary valve.

5. In a valve mechanism, the combination with a suitable casing having a passageway therethrough and a valve seat in said passageway, of means for opening and closing the said passageway through the casing comprising a main valve arranged to reciprocate to and from said valve seat, a hollow rotary valve surrounding said main valve, and mechanical means for controlling the operation of both of said valves, said means acting to rotate said rotary valve when said reciprocatory valve is moved a predetermined distance away from the said valve seat, and at other times acting to cause the movement of said main valve within the rotary valve.

6. In a valve mechanism, the combination with a suitable casing having a passageway therethrough and a valve seat in said passageway, of means for opening and closing the said passageway through the casing comprising a hollow rotary valve, a main valve arranged to reciprocate within said rotary valve and to rotate it, and mechanical means arranged to move said main valve a predetermined distance away from said valve seat and then to rotate it.

7. In a valve mechanism, the combination with a suitable casing having a passageway therethrough and a valve seat in said passageway, of means for opening and closing the said passageway through the casing comprising a hollow rotary valve, a main valve arranged to reciprocate within said rotary valve and to rotate it, and mechanical means for causing the movement of said main valve toward and from said valve seat and for rotating it when a predetermined distance from said valve seat.

8. In a valve mechanism, the combination with a suitable casing having a passageway therethrough and a valve seat in said passageway, of a rotary tubular valve within said casing for opening and closing the passageway therethrough, a reciprocatory valve for opening and closing the passageway through said casing, arranged to operate within and connected with said rotary valve to effect the simultaneous rotation of the two valves, and means for operating said valves including clutch mechanism arranged to be thrown into operation to oppose the reciprocation of the said reciprocatory valve and cause its rotation after it has moved a predetermined distance in one direction.

9. In a valve mechanism, the combination with a suitable casing having a passageway therethrough and a valve seat in said passageway, of a rotary tubular valve for opening and closing said passageway, a reciprocatory valve arranged to operate within said rotary valve and to coöperate with said valve seat to open and close the said passageway through the casing, said reciprocatory valve being internally screw threaded, a screw threaded valve stem fitted into said reciprocatory valve, and clutch mechanism interposed between said reciprocatable valve and said stem and arranged to cause the valve to turn with the stem and to rotate the said rotary valve.

10. In a valve mechanism, the combination with a suitable casing having a passageway therethrough and a valve seat in said passageway, of a rotary tubular valve for opening and closing said passageway, a reciprocatory valve arranged to operate within said rotary valve and to coöperate with said valve seat to open and close the passageway through the said casing, said reciprocatable valve being internally screw threaded, a screw threaded valve stem fitted within said reciprocating valve, and clutch mechanism interposed between said stem and said reciprocatory valve and comprising a collar movable longitudinally of said stem and carrying a lug or projection adapted to engage with the walls of a correspondingly shaped recess within the reciprocatory valve to cause the said valve to turn with the said stem and to revolve the rotary valve.

11. In a valve mechanism, the combination with a suitable casing having a passageway therethrough and a valve seat therein, of a hollow rotary valve mounted within said casing and arranged to open and close the passageway therethrough, a reciprocatory valve arranged to operate within said rotary valve and connected thereto to rotate therewith, and having a head adapted to engage said valve seat in the casing, means for reciprocating said reciprocatory valve and forcing and holding its valve head forced against said valve seat, and means for causing the said last described means to turn the said reciprocatory valve and rotate the rotary valve after the reciprocatory valve has traveled a predetermined distance within said rotary valve.

12. In a valve mechanism, the combination with a suitable casing having a passageway therethrough and a valve seat therein, of a hollow rotary valve within said casing for opening and closing the said passageway, a valve arranged to reciprocate within said rotary valve to open and close the said passageway at said valve seat, and connected with said rotary valve to rotate therewith, and a single hand operated device for controlling the operation of both of said valves, and adapted to cause their simultaneous rotation only when the reciprocatory valve is moved a predetermined distance away from the said valve seat.

13. In a valve mechanism, the combination with a suitable casing having a passageway therethrough and a valve seat therein, of a hollow rotary valve within said casing for opening and closing said passageway, a valve arranged to reciprocate within said hollow valve and to coöperate with said valve seat for opening and closing the passageway through the casing, and a single rotary device for controlling the operation of both of said valves and adapted to force and hold said reciprocatory valve forced against said valve seat.

14. In a valve mechanism, the combination with a suitable casing having a passageway therethrough and a valve seat in said passageway, of a main reciprocatory valve adapted to seat against said valve seat, a rotary valve surrounding said reciprocatory valve and adapted to open and close the passageway through said casing, and means for operating said valve to open and close the passageway through the said casing, arranged to open the pasageway by first lifting the said main valve a predetermined distance from said valve seat and then rotating said rotary valve, and arranged to close the passageway by first rotating said rotary valve a predetermined distance and then closing the main valve against said valve seat.

In testimony whereof I affix my signature, in presence of two subscribing witnesses.

AUGUSTUS H. BOSTLEY.

Witnesses:
B. F. AUCHMUTZ,
GEO. H. YOUNG.